United States Patent
Cunningham et al.

(10) Patent No.: US 11,062,284 B1
(45) Date of Patent: Jul. 13, 2021

(54) SYSTEMS AND METHODS FOR FACILITATING TRANSACTIONS OF VIRTUAL ITEMS BETWEEN USERS OF AN ONLINE GAME

(71) Applicant: Mythical, Inc., Sherman Oaks, CA (US)

(72) Inventors: Stephan Cunningham, Pasadena, CA (US); Rudy Koch, Seattle, WA (US); Liwen Kao, Pasadena, CA (US); John Linden, Sherman Oaks, CA (US)

(73) Assignee: Mythical, Inc., Sherman Oaks (CA)

( * ) Notice: Subject to any disclaimer, the term of this patent is extended or adjusted under 35 U.S.C. 154(b) by 0 days.

(21) Appl. No.: 16/532,144

(22) Filed: Aug. 5, 2019

(51) Int. Cl.
| | |
|---|---|
| G06Q 30/00 | (2012.01) |
| G06Q 20/12 | (2012.01) |
| G06Q 20/40 | (2012.01) |
| G06Q 30/06 | (2012.01) |
| A63F 13/79 | (2014.01) |
| A63F 13/85 | (2014.01) |

(52) U.S. Cl.
CPC ......... *G06Q 20/1235* (2013.01); *A63F 13/79* (2014.09); *A63F 13/85* (2014.09); *G06Q 20/407* (2013.01); *G06Q 30/0641* (2013.01); *A63F 2300/5546* (2013.01); *A63F 2300/575* (2013.01)

(58) Field of Classification Search
CPC ....................... G06Q 20/1235; G06Q 30/0641
USPC ...................................................... 705/26.1
See application file for complete search history.

(56) References Cited

U.S. PATENT DOCUMENTS

| | | |
|---|---|---|
| 6,085,169 A | 7/2000 | Walker |
| 10,740,733 B2 | 8/2020 | Moir |
| 2002/0123938 A1 | 9/2002 | Yu |
| 2011/0302037 A1 | 12/2011 | Sutton-Shearer |
| 2012/0015699 A1 | 1/2012 | Kalvachev |
| 2012/0030069 A1 | 2/2012 | Garg |
| 2013/0110720 A1 | 5/2013 | Rekhi |
| 2014/0335948 A1 | 11/2014 | Jung |
| 2016/0292680 A1* | 10/2016 | Wilson, Jr. ............. G06Q 20/02 |
| 2017/0083959 A1 | 3/2017 | Bousis |
| 2017/0148264 A1 | 5/2017 | Pichette et al. |

(Continued)

OTHER PUBLICATIONS

Game X coin launches first blockchain game platform: Korea-based startup aims to disrupt the video game industry with game cryptocurrency. (Aug. 2, 2018). NASDAQ OMX's News Release Distribution Channel (Year: 2018).*

(Continued)

*Primary Examiner* — Jason B Dunham
*Assistant Examiner* — Arielle E Weiner
(74) *Attorney, Agent, or Firm* — Esplin & Associates, PC

(57) ABSTRACT

Systems and methods for facilitating transactions of virtual items between users of an online game are disclosed. Exemplary implementations may: receive a sales request that indicates a selling user will be offering for sale a particular virtual item from a seller's inventory through an online sales platform; assign the ownership of the particular virtual item temporarily to a holding account; publish a sales listing of the particular virtual item on the online sales platform; receive sales information from the online sales platform indicating whether the particular virtual item has been purchased; assign the ownership of the particular virtual item to the buyer's account; and transfer at least a portion of a sales amount received from the buying user to the seller's account.

16 Claims, 4 Drawing Sheets

(56) References Cited

U.S. PATENT DOCUMENTS

| | | |
|---|---|---|
| 2018/0078843 A1 | 3/2018 | Tran |
| 2018/0114403 A1* | 4/2018 | Jayachandran ....... H04L 9/3297 |
| 2018/0117447 A1 | 5/2018 | Tran |
| 2018/0204260 A1* | 7/2018 | McGregor ......... G06Q 30/0609 |
| 2018/0205740 A1 | 7/2018 | Clark |
| 2018/0247191 A1 | 8/2018 | Katz |
| 2018/0276630 A1 | 9/2018 | Kim |
| 2019/0005595 A1* | 1/2019 | Tautenhan ............ H04L 9/3236 |
| 2019/0205873 A1* | 7/2019 | Kamalsky ........... G06F 16/1805 |
| 2019/0220836 A1 | 7/2019 | Caldwell |
| 2019/0236605 A1* | 8/2019 | Mchale ............... G06Q 20/389 |
| 2019/0282906 A1* | 9/2019 | Yong .................. G06Q 20/0658 |
| 2019/0295371 A1* | 9/2019 | Simons ................ H04L 9/3239 |
| 2019/0303892 A1 | 10/2019 | Yantis |
| 2019/0311341 A1 | 10/2019 | Rice |
| 2019/0340623 A1* | 11/2019 | Rivkind ............. G06F 16/2365 |
| 2019/0361917 A1 | 11/2019 | Tran |
| 2019/0386969 A1 | 12/2019 | Verzun |
| 2020/0005284 A1 | 1/2020 | Vijayan |
| 2020/0013048 A1* | 1/2020 | Love ................... G06Q 20/204 |
| 2020/0026548 A1 | 1/2020 | Huang |
| 2020/0074853 A1 | 3/2020 | Miller |
| 2020/0097927 A1* | 3/2020 | Groarke ................ G06Q 20/02 |
| 2020/0184041 A1 | 6/2020 | Andon |
| 2020/0202668 A1* | 6/2020 | Cotta .................. G07F 17/3281 |
| 2020/0211092 A1* | 7/2020 | Sarin ....................... H04L 67/28 |
| 2020/0273048 A1 | 8/2020 | Andon |
| 2021/0073881 A1 | 3/2021 | Stoddard |

OTHER PUBLICATIONS

Continued from U: Retrieved from https://search.proquest.com/wire-feeds/game-x-coin-launches-first-blockchain-platform/docview/2081459699/se-2?accountid=14753 (Year: 2018).*

Zheng Qin, "Introduction to E-commerce", 2009, Springer, springer.com (Year: 2009), pp. 298-301.

Janice Podsada; "With Sales of Virtual Goods, the Reality Is Serious Revenue"; Jan. 7, 2009; Tribune Content Agency LLC (Year: 2009) (3 pages).

* cited by examiner

SYSTEMS AND METHODS FOR FACILITATING TRANSACTIONS OF VIRTUAL ITEMS BETWEEN USERS OF AN ONLINE GAME

FIELD OF THE DISCLOSURE

The present disclosure relates to systems and methods for facilitating transactions of virtual items between users of an online game.

BACKGROUND

Players of online games buying virtual items that can be used in the online game is known. Players selling virtual items to other players is known. Online sales platforms are known.

SUMMARY

One aspect of the present disclosure relates to a system configured for facilitating transactions of virtual items between users of an online game. The system may include one or more hardware processors configured by machine-readable instructions. The processor(s) may be configured to manage user accounts for the users in the online game. Individual ones of the user accounts may be associated with individual ones of the users. The individual ones of the user accounts may include individual user inventories of virtual items that are usable within the online game by the individual ones of the users. The users may include a selling user. The selling user may be associated with a seller's account. The seller's account may include a seller's inventory of one or more virtual items that are usable by the selling user within the online game. The processor(s) may be configured to receive a sales request that indicates the selling user will be offering for sale a particular virtual item from the seller's inventory through an online sales platform. Ownership of the particular virtual item may be assigned to the seller's account. The processor(s) may be configured to assign the ownership of the particular virtual item temporarily to a holding account such that the selling user is unable to transfer or modify the ownership of the particular virtual item while the ownership of the particular virtual item is assigned to the holding account, responsive to receipt of the sales request. The holding account may be not under control of the selling user. The processor(s) may be configured to generate a sales listing of the particular virtual item for publication on the online sales platform. The sales listing may include pricing information for prospective buying users and descriptive information that describes the particular virtual item. The processor(s) may be configured to effectuate the publication of the sales listing of the particular virtual item on the online sales platform, e.g., for a limited duration. The processor(s) may be configured to receive sales information from the online sales platform indicating whether the particular virtual item has been purchased. The processor(s) may be configured to identify a buyer's account of a buying user that has effectuated a purchase of the particular virtual item through the online sales platform, responsive to receipt of the sales information indicating the particular virtual item has been purchased. The buyer's account may include a buyer's inventory of virtual items that are usable by the buying user within the online game. The processor(s) may be configured to assign the ownership of the particular virtual item to the buyer's account, responsive to receipt of the sales information indicating the particular virtual item has been purchased, such that the particular virtual item is included in the buyer's inventory and accessible to be used by the buying user within the online game. The processor(s) may be configured to transfer at least a portion of a sales amount received from the buying user to the seller's account. The processor(s) may be configured to assign the ownership of the particular virtual item to the seller's account, responsive to receipt of the sales information indicating the particular virtual item has not been purchased.

Another aspect of the present disclosure relates to a method for facilitating transactions of virtual items between users of an online game. The method may include managing user accounts for the users in the online game. Individual ones of the user accounts may be associated with individual ones of the users. The individual ones of the user accounts may include individual user inventories of virtual items that are usable within the online game by the individual ones of the users. The users may include a selling user. The selling user may be associated with a seller's account. The seller's account may include a seller's inventory of one or more virtual items that are usable by the selling user within the online game. The method may include receiving a sales request that indicates the selling user will be offering for sale a particular virtual item from the seller's inventory through an online sales platform. Ownership of the particular virtual item may be assigned to the seller's account. The method may include assigning the ownership of the particular virtual item temporarily to a holding account such that the selling user is unable to transfer or modify the ownership of the particular virtual item while the ownership of the particular virtual item is assigned to the holding account, responsive to receipt of the sales request. The holding account may be not under control of the selling user. The method may include generating a sales listing of the particular virtual item for publication on the online sales platform. The sales listing may include pricing information for prospective buying users and descriptive information that describes the particular virtual item. The method may include effectuating the publication of the sales listing of the particular virtual item on the online sales platform, e.g., for a limited duration. The method may include receiving sales information from the online sales platform indicating whether the particular virtual item has been purchased. The method may include identifying a buyer's account of a buying user that has effectuated a purchase of the particular virtual item through the online sales platform, responsive to receipt of the sales information indicating the particular virtual item has been purchased. The buyer's account may include a buyer's inventory of virtual items that are usable by the buying user within the online game. The method may include assigning the ownership of the particular virtual item to the buyer's account, responsive to receipt of the sales information indicating the particular virtual item has been purchased, such that the particular virtual item is included in the buyer's inventory and accessible to be used by the buying user within the online game. The method may include transferring at least a portion of a sales amount received from the buying user to the seller's account. The method may include assigning the ownership of the particular virtual item to the seller's account, responsive to receipt of the sales information indicating the particular virtual item has not been purchased.

As used herein, any association (or relation, or reflection, or indication, or correspondency) involving servers, processors, client computing platforms, users, accounts, inventories, virtual items, requests, offers, listings, purchases, sales amounts, portions, verifications, determinations, identifications, publications, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
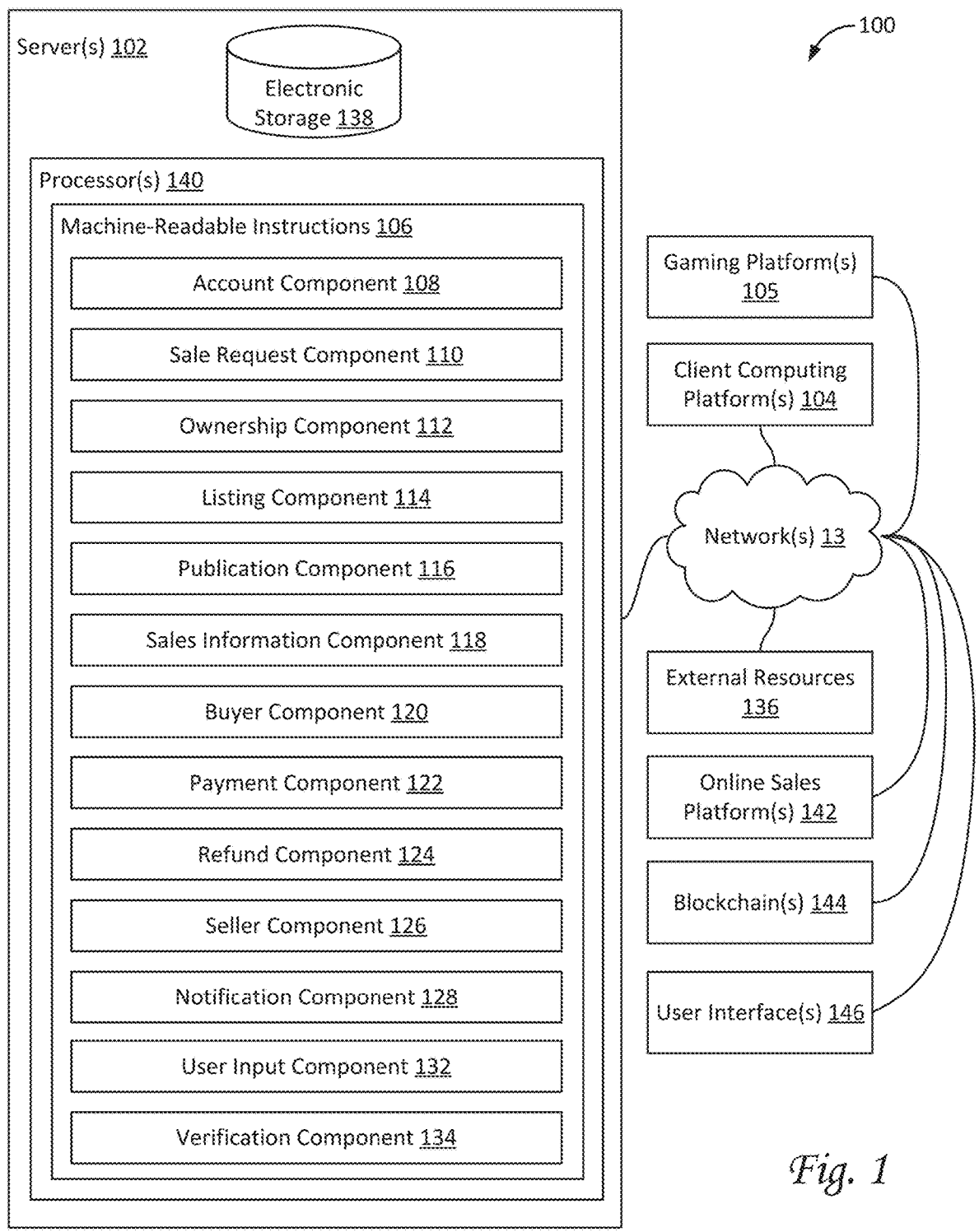
FIG. 1 illustrates a system configured for facilitating transactions of virtual items between users of an online game, in accordance with one or more implementations.

FIG. 1 illustrates a system 100 configured for facilitating transactions of virtual items between users of an online game, in accordance with one or more implementations. For example, the online game may be provided and/or hosted by one or more gaming platforms 105. In some implementations, system 100 may include one or more servers 102, one or more processors 140, electronic storage 138, one or more client computing platforms 104, one or more gaming platforms 105, one or more online sales platforms 142, one or more blockchains 144, one or more user interfaces 146, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

The users may include one or more selling users, one or more buying users, and/or other users. For example, the users may include a first selling user, a second selling user, a first buying user, a second buying user, a first user, a second user, a third user, and so forth.

Server(s) 102 may be configured by machine-readable instructions 106. Machine-readable instructions 106 may include one or more instruction components. The instruction components may include computer program components. The instruction components may include one or more of account component 108, sale request component 110, ownership component 112, listing component 114, publication component 116, sales information component 118, buyer component 120, payment component 122, refund component 124, seller component 126, notification component 128, user input component 132, verification component 134, and/or other instruction components.

Account component 108 may be configured to manage user accounts for users, including but not limited to the users in an online game. In some implementations, account component 108 may be configured to manage user inventories for users, including but not limited to the users in an online game. Individual ones of the user accounts may be associated with individual ones of the users. For example, a seller's account may be associated with a selling user (also referred to as a seller), a buyer's account may be associated with a buying user (also referred to as a buyer), a first user account may be associated with a first user, a second user account may be associated with a second user, and so forth. The individual ones of the user accounts may include individual user inventories of virtual items that are usable within the online game by the individual ones of the users. For example, the seller's account may include a seller's inventory, the buyer's account may include a buyer's inventory, the first user account may include a first user inventory, the second user account may include a second user inventory, and so forth. The virtual items included in an inventory may include virtual objects, characters, avatars, skills, abilities, virtual currency, virtual content of the online game, access rights within the online game, rights to (future) benefits within the online game, and/or other valuables within the online game.

In some implementations, account component 108 may be configured to manage user accounts in one or more online sales platforms 142. In some implementations, account component 108 may be configured to facilitate a link or connection between user accounts of users within the online game and user accounts in one or more online sales platforms 142.

Sale request component 110 may be configured to receive requests from users, including but not limited to sales requests. In some implementations, a request may involve a modification in the ownership of one or more virtual items. In some implementations, a sales request may indicate a user, e.g. the selling user, who will be offering for sale a particular virtual item, e.g., from the seller's inventory. As used herein, auctions may be considered a type of sale. In some implementations, virtual items may be offered for sale through online sales platform 142. In some implementations, virtual items may be offered for sale through gaming platform 105. In some implementations, a particular user may offer a virtual item for sale if the particular user owns the virtual item and/or owns the right to sell the virtual item (or the right to offer the virtual item for sale). In some implementations, ownership of virtual items may be established by and/or based on the virtual items being included in particular inventories. In some implementations, ownership of virtual items may be established by and/or based on assignment of the ownership to particular user accounts and/or inventories. In some implementations, ownership of virtual items may be recorded in a digital ledger, decentralized database, blockchain, and/or other mechanism that includes electronic storage. For example, assignments of the ownership of the particular virtual item may be recorded on blockchain 144 that stores a registry of assets and transactions. In some implementations, the assets of blockchain 144 may include the particular virtual item. In some implementations, ownership of the particular virtual item may be assigned, prior to a sale, to the seller's account. This may be referred to as the seller owning the particular virtual item.

Ownership component 112 may be configured to determine, assign, and/or otherwise modify ownership of virtual items, including but not limited to virtual items that are usable within one or more online games. For example, ownership component 112 may be configured to assign the ownership of a particular virtual item to a particular user account. In some implementations, modifications of ownership may be temporary. For example, ownership component 112 may be configured to assign the ownership of a particular virtual item temporarily to a holding account. For example, the holding account may be not associated with (and/or otherwise under control of) user accounts such as a seller's account or a buyer's account. In some implementations, the holding account may hold virtual items in escrow during transactions between users. In some implementations, assigning the ownership of the particular virtual item temporarily to the holding account may be performed such that the selling user is further unable to transfer, sell, and/or otherwise use the particular virtual item within the online game (e.g., at least while ownership is assigned to the holding account). This may prevent changes to the particular virtual item during a sales transaction. In some implementations, actions performed by ownership component 112 (e.g., determinations, assignments, and/or modifications) may be performed in responsive to actions performed by other components of system 100, including but not limited to sale request component 110.

In some implementations, ownership component 112 may be configured to assign the ownership of a particular virtual item to a buyer's account, e.g., responsive to receipt of sales information indicating the particular virtual item has been purchased by a buyer. Subsequent to such an assignment, the particular virtual item may be included in a buyer's inventory and accessible to be used by the buying user within the online game.

In some implementations, ownership component 112 may be configured to assign the ownership of a particular virtual item to the seller's account, responsive to receipt of sales information indicating the particular virtual item has not been purchased. For example, a seller may have offered the particular virtual item for sale (such that the ownership was assigned to a holding account). Responsive to a determination that the particular virtual item has not been sold, ownership component 112 may be configured to assign the ownership from the holding account back to the seller's account.

In some implementations, subsequent to a purchase of a particular virtual item by a buyer, ownership component 112 may be configured to assign the ownership of the particular virtual item temporarily to a holding account, responsive to receipt of a refund request by the buyer. In some implementations, subsequent to receipt of the refund request, the buying user may be unable to transfer or modify the ownership of the particular virtual item while the ownership of the particular virtual item is (temporarily) assigned to the holding account. Subsequent to the refund request being deemed legitimate and/or otherwise valid, ownership component 112 may be configured to assign the ownership of the particular virtual item back to the original seller's account, such that the particular virtual item is included in the seller's inventory and accessible to the used by the selling user within the online game. Alternatively, subsequent to the refund request being deemed not legitimate and/or otherwise not valid, ownership component 112 may be configured to assign the ownership of the particular virtual item to the buyer's account, effectively rejecting the refund request.

Listing component 114 may be configured to generate sales listings of virtual items for publication on online sales platform 142. A particular sales listing for a particular virtual item may include pricing information for prospective buyers, descriptive information that describes the particular virtual item, and/or other information. In some implementations, a sales listing may include multiple require fields and one or more optional fields of relevant information. In some implementations, one or more fields may be filled automatically, e.g., by listing component 114, based on information received by sale request component 110. In some implementations, a seller may be prompted to provide and/or confirm information for one or more fields such that generation of a particular sales listing may be completed.

Publication component 116 may be configured to effectuate publication of sales listings on online sales platform 142. In some implementations, a particular sales listing may be published for a limited duration. For example, an auction may have a limited duration. In some implementations, online sales platform 142 may support an Application Programming Interface (API) for the publication of sales listings. In some implementations, online sales platform 142 may be external to gaming platform 105 and/or system 100. For example, in some implementations, online sales platform 142 may be EBay™, Amazon™, Etsy™, and/or another platform that supports online sales transactions.

Sales information component 118 may be configured to receive information from online sales platform 142, including but not limited to sales information pertaining to sales activity. In some implementations, sales information may indicate whether a particular virtual item has been purchased. In some implementations, sales information may indicate whether a particular sales listing has received a bid. In some implementations, sales information from online sales platform 142 pertaining to a particular sales listing may be received upon expiration of a limited duration that is associated with the particular sales listing.

Buyer component 120 may be configured to identify accounts, including but not limited to user accounts of buyers of virtual items. For example, buyer component 120 may be configured to identify a buyer's account of a buying user that has effectuated a purchase of a particular virtual item through online sales platform 142. In some implementations, identification may be performed responsive to receipt of sales information indicating a particular virtual item has been purchased. The buyer's account may include a buyer's inventory of virtual items that are usable by the buying user within the online game. In some implementations, identifying the buyer's account of the buying user may include generating a redemption code for the particular virtual item. In some implementations, assigning the ownership of the particular virtual item to the buyer's account may be performed responsive to redemption of the redemption code, e.g., by the buyer. In some implementations, a buyer may have a user account with online sales platform 142 (i.e., at the moment of the purchase of a particular virtual item), but not with gaming platform 105. In such a case, buyer component 120 may be configured to facilitate the creation of a buyer's account with gaming platform 105. Once the buyer's account is created and subsequently identified, ownership of a purchased virtual item may be assigned to the buyer's account.

Payment component 122 may be configured to transfer payments between different accounts and/or different users, including a seller's account, a buyer's account, and/or other user accounts. In some implementations, payment component 122 may receive payments on behalf of buyers, e.g. from online sales platform 142. In some implementations, payment component 122 may receive payments on behalf of sellers. In some implementations, payment component 112 may be configured to transfer at least a portion of a sales amount received from a buying user to a seller's account. In some implementations, for example in case of a refund, payment component 122 may be configured to receive at least a portion of the sales amount from the original seller's account. In some implementations, for example in case of a refund, payment component 122 may be configured to transfer at least a portion of a sales amount to the original buyer's account. Payment component 122 may be configured to share portions of payments with other stakeholders, including but not limited to online sales platform 142 (e.g., a sales service fee or a transaction fee), gaming platform 105, an original creator or designer of the sold virtual item, and/or other interested parties.

Refund component 124 may be configured to receive refund requests. and/or other refund-related information. In some implementations, a refund request may indicate a buyer is attempting to revert a particular purchase of a particular virtual item. In some implementations, a refund request may be received through online sales platform 142 on behalf of the buyer. In some implementations, a refund request may be received through gaming platform 105.

Seller component 126 may be configured to determine and/or identify accounts of sellers. For example, seller component 126 may be configured to identify a seller's account of a selling user from whom a buying user originally purchased a particular virtual item. For example, seller component 126 may be configured to determine, store, and/or otherwise manage historic purchase information for purchased virtual items. In some implementations, seller component 126 may be configured to determine correlations between sellers and buyers based on sales transactions between the sellers and buyers.

Notification component 128 may be configured to create, generate, present, and/or transfer notifications to users. For example, notification component 128 may be configured to notify a particular selling user that a particular buying user is attempting to revert a particular purchase of a particular virtual item. In some implementations, notification component 128 may be configured to notify a particular buying user that a particular selling user is attempting to revert a particular sale of a particular virtual item. In some implementations, notifying the selling user may include requesting the selling user to return at least the second portion of the sales amount. In some implementations, notifying the buying user may include requesting the buying user to return the purchased virtual item. In some implementations, notifications may be presented to users through user interfaces 146.

User input component 132 may be configured to receive user input from users, for example through client computing platforms 104. In some implementations, user input component may receive user input from a selling user, a buying user, and/or other users. For example, user input may confirm the selling user's consent to publication of the sales listing. The publication of the sales listing may be effectuated subsequent to a verification whether the selling user has ownership of the particular virtual item. The publication of the sales listing may be effectuated subsequent to receipt of the user input from the selling user. In some implementations, publication of the sales listing on the online sales platform may effectuate an auction for the particular virtual item. In some implementations, user input component 132 may be implemented through user interfaces 146.

User interfaces 146 may be configured to facilitate interaction between users and system 100 and/or between users and client computing platforms 104. For example, user interfaces 146 may provide an interface through which users may provide information to and/or receive information from system 100. In some implementations, user interface 146 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 146 may be included in one or more client computing platforms 104. In some implementations, one or more user interfaces 146 may be included in system 100.

Verification component 134 may be configured to perform verifications pertaining to sales activities. For example, a verification may verify whether a particular sales request is associated with a user and/or a user account. For example, a verification may verify whether a particular sales request is associated with a user account of a user that is allowed to initiate sales transactions. For example, a verification may verify whether a refund request is legitimate and/or valid such that a particular purchase of a particular virtual item should be reverted. In some implementations, verifications may be based on information in the registry that is stored in blockchain 144.

Figure 3:
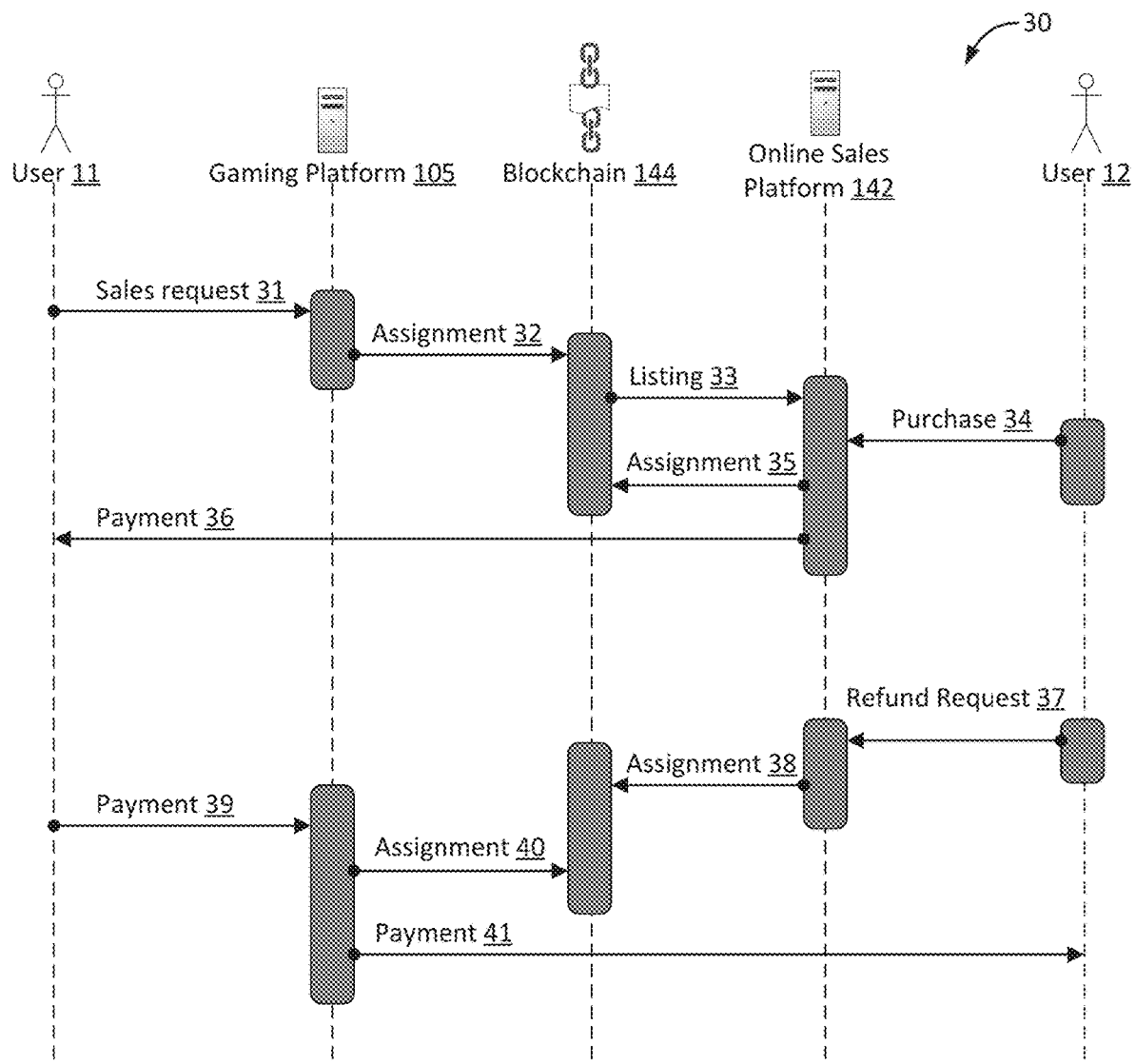
FIGS. 3-4 illustrate transactional diagrams of actions and transactions performed in a system that facilitates transactions of virtual items between two users of an online game, in accordance with one or more implementations.

By way of non-limiting example, FIG. 3 illustrates an exemplary transactional diagram 30 of actions and transactions performed in system 100. A first transaction in transactional diagram 30 represents a sale of a particular virtual item from user 11 to user 12, and is initiated by a sales request 31 from user 11 to gaming platform 105. Subsequent to sales request 31, an assignment 32 assigns the ownership of the particular virtual item to a holding account on blockchain 144. In some implementations, assignments may be initiated by gaming platform 105 and implemented by blockchain 144. Subsequent to assignment 32, a listing 33 is generated and published on online sales platform 142. Subsequent to publishing the sales listing, user 12 purchases the particular virtual item through a purchase 34 (accompanied by a sales amount, not depicted). Sales information pertaining to purchase 34 may be provided to blockchain 144. Subsequently, an assignment 35 assigns the ownership of the particular virtual item to the account of user 12. A payment 36 (presumably the lion share received from user 12) is transferred to the seller, user 11. A second transaction depicted in transactional diagram 30 of FIG. 3 represents a refund of the particular virtual item from user 12 back to user 11, and is initiated by a refund request 37 from user 12 to online sales platform 142. Information pertaining to the refund request may be provided to blockchain 144. Subsequent to refund request 37, an assignment 38 assigns the ownership of the particular virtual item to a holding account on blockchain 144. A payment 39 (presumably the lion share received by user 11) is received from user 11 and transferred to gaming platform 105. Subsequently, a payment 41 is transferred back to the original buyer, user 12. An assignment 40 assigns to ownership of the particular virtual item to the original seller, user 11. The order of the actions in transactional diagram 30 is exemplary and not intended to be limiting.

Figure 4:
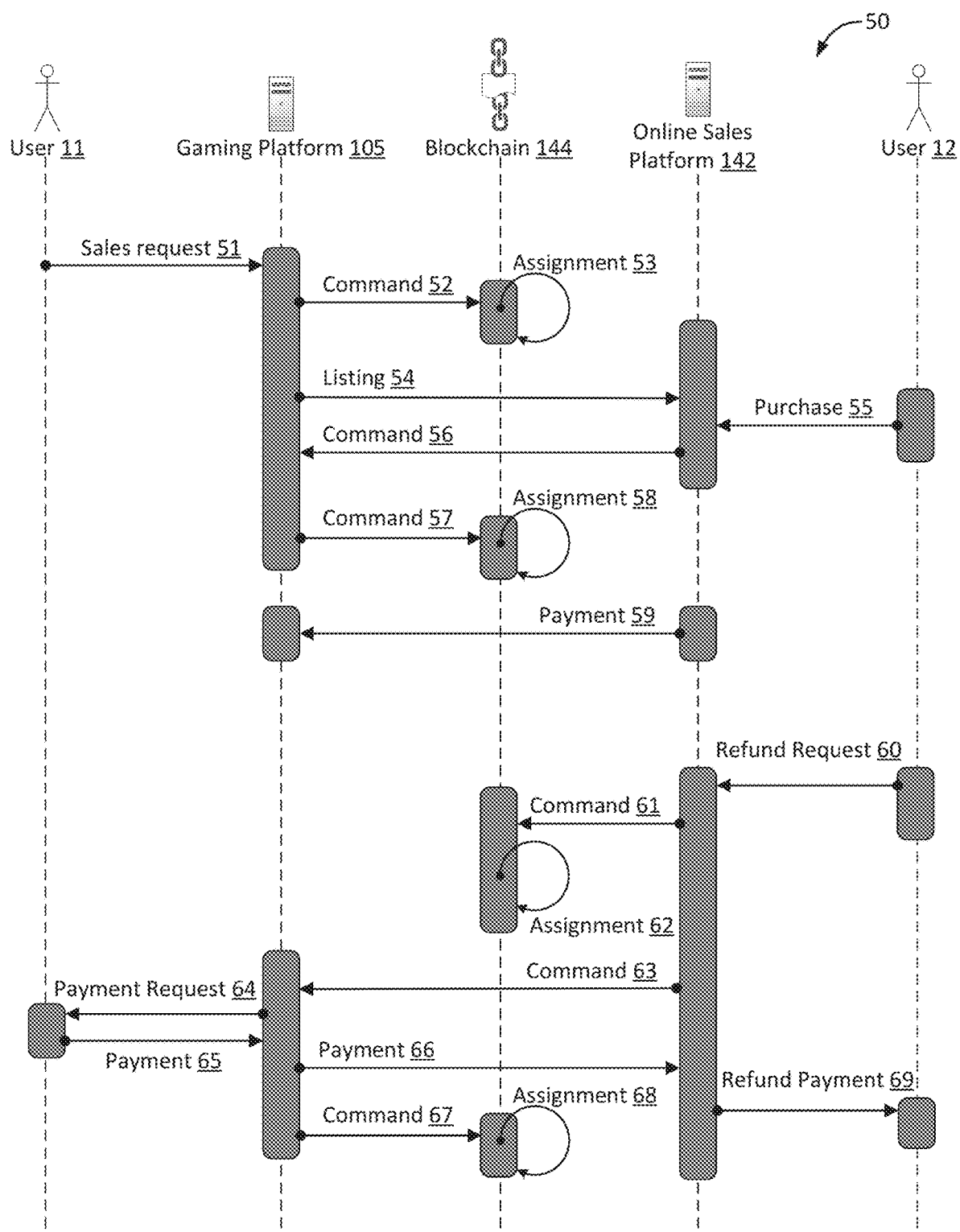

By way of non-limiting example, FIG. 4 illustrates an exemplary transactional diagram 50 of actions and transactions performed in system 100. A first transaction in transactional diagram 50 represents a sale of a particular virtual item from user 11 to user 12, and is initiated by a sales request 51 from user 11 to gaming platform 105. Subsequent to sales request 51, a command 52 is transmitted to blockchain 144, which in response performs an assignment 53 that assigns the ownership of the particular virtual item to a holding account on blockchain 144. Subsequent to sales request 51, a listing 54 is generated and published on online sales platform 142. Subsequent to publishing the sales listing, user 12 purchases, through online sales platform 142, the particular virtual item through a purchase 55 (accompanied by a sales amount, not depicted). Sales information pertaining to purchase 55 may be provided to blockchain 144 and/or gaming platform 105. Subsequently, a command 56 is transmitted to gaming platform 105, which in response transmits a command 57 to blockchain 144, which in response performs an assignment 58 that assigns the ownership of the particular virtual item to the account of user 12. A payment 59 (presumably the lion share received from user 12) is transferred to the user account of the seller, user 11. As shown in relation to the transaction initiated by sales request 51, in some implementations, online sales platform 142 may not directly access blockchain 144, but rather use gaming platform 105 (or another entity) as an intermediary to effectuate actions taken by and/or on blockchain 144.

A second transaction depicted in transactional diagram 50 of FIG. 4 represents a refund of the particular virtual item from user 12 back to user 11, and is initiated by a refund request 60 from user 12 to online sales platform 142. A command 61 responsive to the refund request may be transmitted to blockchain 144. In response to command 61, an assignment 62 assigns the ownership of the particular virtual item to a holding account on blockchain 144. In response to refund request 60, a command 63 may be transmitted to gaming platform 105, which in response provides a payment request 64 to user 11. Payment request 64 requests user 11 to make a payment 65 (presumably the lion share received by user 11 through payment 59). Subsequently, a payment 66 is transmitted from gaming platform 105 to online sales platform 142, and a refund payment 69 is received by user 12. A command 67 may be transmitted to blockchain 67, which in response performs an assignment 68 that assigns the ownership of the particular virtual item to the original seller, user 11. The order of the actions in transactional diagram 50 is exemplary and not intended to be limiting. For example, additional payments may be made to gaming platform 105, online sales platform 142, and/or other stakeholders, e.g., for sales fees, service fees, commissions, profit sharing, and/or other benefits or entitlements.

Referring to FIG. 1, in some implementations, server(s) 102, client computing platform(s) 104, and/or external resources 136 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 136 may be operatively linked via some other communication media.

A given client computing platform 104 may include one or more processors configured to execute computer program components. The computer program components may be configured to enable an expert or user associated with the given client computing platform 104 to interface with system 100 and/or external resources 136, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 136 may include sources of information outside of system 100, external entities participating with system 100, and/or other resources. In some implementations, some or all of the functionality attributed herein to external resources 136 may be provided by resources included in system 100.

Server(s) 102 may include electronic storage 138, one or more processors 140, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 138 may include non-transitory storage media that electronically stores information. The electronic storage media of electronic storage 138 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 138 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 138 may include one or more virtual storage resources (e.g., cloud storage, a virtual private network, and/or other virtual storage resources). Electronic storage 138 may store software algorithms, information determined by processor(s) 140, information received from server(s) 102, information received from client computing platform(s) 104, and/or other information that enables server(s) 102 to function as described herein.

Processor(s) 140 may be configured to provide information processing capabilities in server(s) 102. As such, processor(s) 140 may include one or more of a digital processor, an analog processor, a digital circuit designed to process information, an analog circuit designed to process information, a state machine, and/or other mechanisms for electronically processing information. Although processor(s) 140 is shown in FIG. 1 as a single entity, this is for illustrative purposes only. In some implementations, processor(s) 140 may include a plurality of processing units. These processing units may be physically located within the same device, or processor(s) 140 may represent processing functionality of a plurality of devices operating in coordination. Processor(s) 140 may be configured to execute components 108, 110, 112, 114, 116, 118, 120, 122, 124, 126, 128, 132, and/or 134, and/or other components. Processor(s) 140 may be configured to execute components 108, 110, 112, 114, 116, 118, 120, 122, 124, 126, 128, 132, and/or 134, and/or other components by software; hardware; firmware; some combination of software, hardware, and/or firmware; and/or other mechanisms for configuring processing capabilities on processor(s) 140. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 126, 128, 132, and/or 134 are illustrated in FIG. 1 as being implemented within a single processing unit, in implementations in which processor(s) 140 includes multiple processing units, one or more of components 108, 110, 112, 114, 116, 118, 120, 122, 124, 126, 128, 132, and/or 134 may be implemented remotely from the other components. The description of the functionality provided by the different components 108, 110, 112, 114, 116, 118, 120, 122, 124, 126, 128, 132, and/or 134 described below is for illustrative purposes, and is not intended to be limiting, as any of components 108, 110, 112, 114, 116, 118, 120, 122, 124, 126, 128, 132, and/or 134 may provide more or less functionality than is described. For example, one or more of components 108, 110, 112, 114, 116, 118, 120, 122, 124, 126, 128, and/or 134 may be eliminated, and some or all of its functionality may be provided by other ones of components 108, 110, 112, 114, 116, 118, 120, 122, 124, 126, 128, and/or 134. As another example, processor(s) 140 may be configured to execute one or more additional components that may perform some or all of the functionality attributed below to one of components 108, 110, 112, 114, 116, 118, 120, 122, 124, 126, 128, 132, and/or 134.

Figure 2:
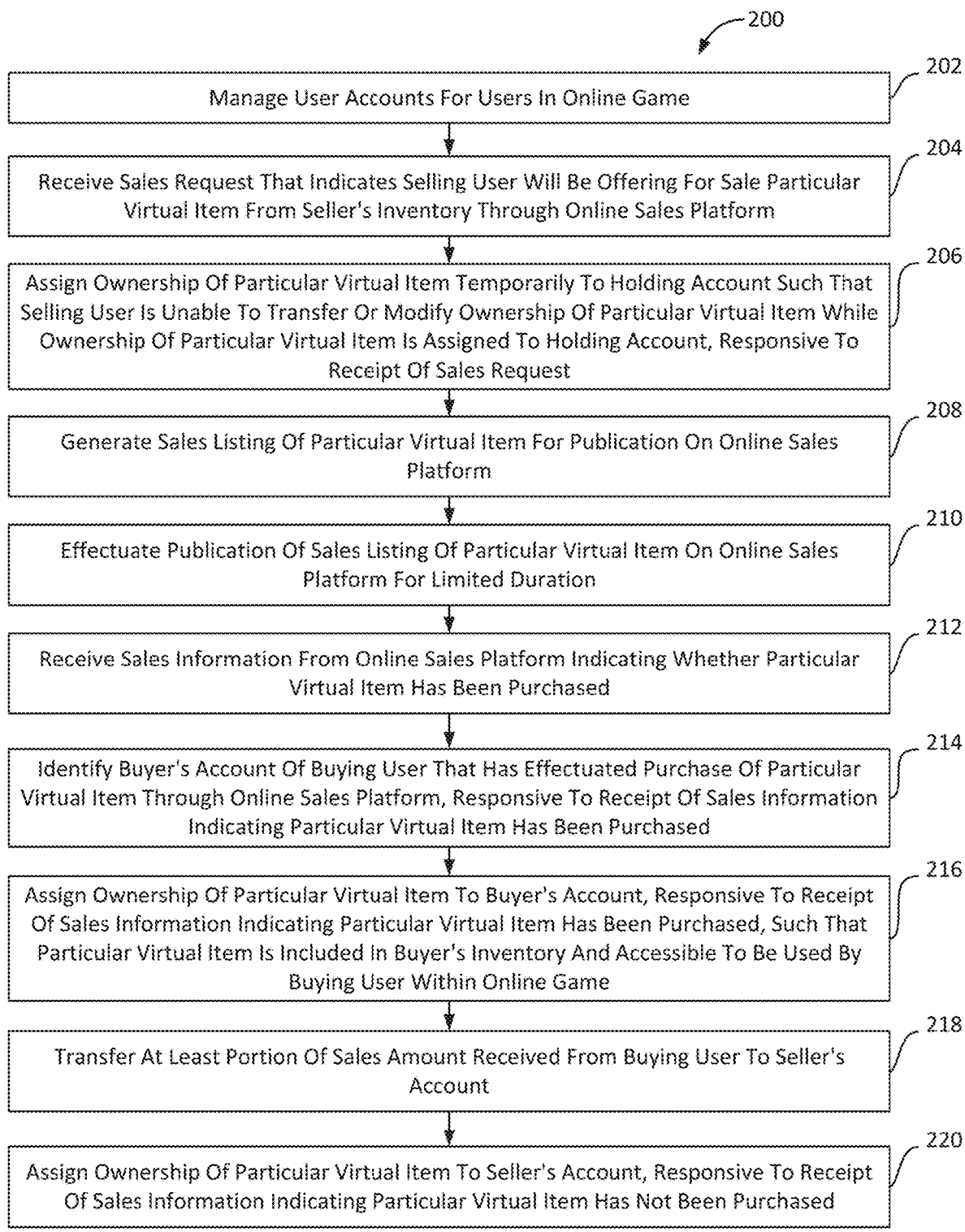
FIG. 2 illustrates a method for facilitating transactions of virtual items between users of an online game, in accordance with one or more implementations.

FIG. 2 illustrates a method 200 for facilitating transactions of virtual items between users of an online game, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include managing user accounts for the users in the online game. Individual ones of the user accounts may be associated with individual ones of the users. The individual ones of the user accounts may include individual user inventories of virtual items that are usable within the online game by the individual ones of the users. The users may include a selling user. The selling user may be associated with a seller's account. The seller's account may include a seller's inventory of one or more virtual items that are usable by the selling user within the online game. Operation 202 may be performed by one or more hardware processors configured by machine-readable instructions including a component that is the same as or similar to account component 108, in accordance with one or more implementations.

An operation 204 may include receiving a sales request that indicates the selling user will be offering for sale a particular virtual item from the seller's inventory through an online sales platform. Ownership of the particular virtual item may be assigned to the seller's account. Operation 204 may be performed by one or more hardware processors configured by machine-readable instructions including a component that is the same as or similar to sale request component 110, in accordance with one or more implementations.

An operation 206 may include assigning the ownership of the particular virtual item temporarily to a holding account such that the selling user is unable to transfer or modify the ownership of the particular virtual item while the ownership of the particular virtual item is assigned to the holding account, responsive to receipt of the sales request. The holding account may be not under control of the selling user. Operation 206 may be performed by one or more hardware processors configured by machine-readable instructions including a component that is the same as or similar to ownership component 112, in accordance with one or more implementations.

An operation 208 may include generating a sales listing of the particular virtual item for publication on the online sales platform. The sales listing may include pricing information for prospective buying users and descriptive information that describes the particular virtual item. Operation 208 may be performed by one or more hardware processors configured by machine-readable instructions including a component that is the same as or similar to listing component 114, in accordance with one or more implementations.

An operation 210 may include effectuating the publication of the sales listing of the particular virtual item on the online sales platform for a limited duration. Operation 210 may be performed by one or more hardware processors configured by machine-readable instructions including a component that is the same as or similar to publication component 116, in accordance with one or more implementations.

An operation 212 may include receiving sales information from the online sales platform indicating whether the particular virtual item has been purchased. Operation 212 may be performed by one or more hardware processors configured by machine-readable instructions including a component that is the same as or similar to sales information component 118, in accordance with one or more implementations.

An operation 214 may include identifying a buyer's account of a buying user that has effectuated a purchase of the particular virtual item through the online sales platform, responsive to receipt of the sales information indicating the particular virtual item has been purchased. The buyer's account may include a buyer's inventory of virtual items that are usable by the buying user within the online game. Operation 214 may be performed by one or more hardware processors configured by machine-readable instructions including a component that is the same as or similar to buyer component 120, in accordance with one or more implementations.

An operation 216 may include assigning the ownership of the particular virtual item to the buyer's account, responsive to receipt of the sales information indicating the particular virtual item has been purchased, such that the particular virtual item is included in the buyer's inventory and accessible to be used by the buying user within the online game. Operation 216 may be performed by one or more hardware processors configured by machine-readable instructions including a component that is the same as or similar to ownership component 112, in accordance with one or more implementations.

An operation 218 may include transferring at least a portion of a sales amount received from the buying user to the seller's account. Operation 218 may be performed by one or more hardware processors configured by machine-readable instructions including a component that is the same as or similar to payment component 122, in accordance with one or more implementations.

An operation 220 may include assigning the ownership of the particular virtual item to the seller's account, responsive to receipt of the sales information indicating the particular virtual item has not been purchased. Operation 220 may be performed by one or more hardware processors configured by machine-readable instructions including a component that is the same as or similar to ownership component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for facilitating refunds from an external online sales platform for refundable transactions of virtual items between users of an online game, wherein the users include a first player of the online game and a second player of the online game, the system comprising:
a decentralized database configured to store a registry of assets and transactions, wherein the assets include a particular virtual item, wherein ownership of the particular virtual item is assigned to an account of the first player, wherein the decentralized database represents a blockchain, and wherein assignments of the ownership of the particular virtual item are recorded on the blockchain;
a gaming platform including one or more hardware processors configured by machine-readable instructions to:
manage user accounts for the users in the online game, wherein individual ones of the user accounts are associated with individual ones of the users, wherein the individual ones of the user accounts include individual user inventories of virtual items that are usable within the online game by the individual ones of the users, wherein the first player is associated with a first player's account, and wherein the first player's account includes a first player's inventory of one or more virtual items that are usable by the first player within the online game;
receive a sales request that indicates the first player will be offering for sale the particular virtual item from the first player's inventory through the external online sales platform, wherein ownership of the particular virtual item is assigned to the first player's account, and wherein the external online sales platform is external to the system, the decentralized database, and the gaming platform; and
transmit a command to the decentralized database to assign the ownership of the particular virtual item temporarily to a holding account such that the first player is unable to transfer or modify the ownership of the particular virtual item while the ownership of the particular virtual item is assigned to the holding account, wherein the holding account is not under control of the first player;
wherein the decentralized database is further configured to receive the command from the gaming platform and execute the command such that the ownership of the particular virtual item is temporarily assigned to the holding account;
wherein the one or more hardware processors included in the gaming platform are further configured by machine-readable instructions to:
generate a sales listing of the particular virtual item for publication on the external online sales platform, wherein the sales listing includes pricing information for prospective buying users and descriptive information that describes the particular virtual item;
effectuate, through a first function call of an Application Programming Interface (API) supported by the external online sales platform, the publication of the sales listing of the particular virtual item on the external online sales platform for a limited duration, wherein the publication of the sales listing is effectuated subsequent to a verification whether the first player has ownership of the particular virtual item according to an assignment recorded on the blockchain, and wherein the verification is based on information in the registry that is stored in the decentralized database;
receive sales information from the external online sales platform indicating whether the particular virtual item has been purchased;
responsive to receipt of the sales information indicating the particular virtual item has been purchased, identify a second player's account of the second player that has effectuated a purchase of the particular virtual item through the external online sales platform, wherein the second player's account includes a second player's inventory of virtual items that are usable by the second player within the online game; and
subsequent to receipt of the sales information indicating the particular virtual item has been purchased, receive a second command to assign the ownership of the particular virtual item to the second player's account;
wherein the one or more hardware processors included in the gaming platform are further configured to transmit a third command to the decentralized database to assign the ownership of the particular virtual item to the second player's account;
wherein the decentralized database is further configured to receive the third command from the gaming platform and execute the third command such that the ownership of the particular virtual item is assigned from the holding account to the second player's account and recorded on the blockchain, such that the particular virtual item is included in the second player's inventory and accessible to be used by the second player within the online game;

wherein the one or more hardware processors included in the gaming platform are further configured by the machine-readable instructions to:
responsive to receipt of the sales information indicating the particular virtual item has been purchased, transfer at least a portion of a sales amount received from the second player to the first player's account;
responsive to receipt of the sales information indicating the particular virtual item has not been purchased, transmit a fourth command to the decentralized database to assign the ownership of the particular virtual item to the first player's account;

wherein the decentralized database is further configured to:
receive the fourth command from the gaming platform and execute the fourth command such that the ownership of the particular virtual item is assigned from the holding account to the first player's account and recorded on the blockchain;
subsequent to receipt of the sales information indicating the particular virtual item has been purchased, receive a first refund command based on a refund request from the second player that indicates the second player is attempting to revert the purchase of the particular virtual item, wherein the first refund command is received through the Application Programming Interface (API) supported by the external online sales platform, wherein the refund request is received through the external online sales platform on behalf of the second player, wherein the first refund command aims to cause the decentralized database to assign and record the ownership of the particular virtual item temporarily to the holding account, responsive to receipt of the first refund command, such that the second player is unable to transfer or modify the ownership of the particular virtual item while the ownership of the particular virtual item is assigned to the holding account, wherein the holding account is not under control of the second player;
identify the first player's account of the first player from whom the second player purchased the particular virtual item;

wherein the one or more hardware processors included in the gaming platform are further configured by the machine-readable instructions to:
notify the first player that the second player is attempting to revert the purchase of the particular virtual item;
request at least a second portion of the sales amount from the first player's account;
receive the second portion of the sales amount from the first player's account;
transfer a second refund command to the decentralized database to assign and record the ownership of the particular virtual item from the holding account to the first player's account, such that the particular virtual item is included in the first player's inventory and accessible to be used by the first player within the online game; and
effectuate, through the Application Programming Interface (API) supported by the external online sales platform, a transfer of at least a third portion of the sales amount to the second player's account to complete reverting the purchase of the particular virtual item as requested by the second player through the refund request.

2. The system of claim 1, wherein the one or more hardware processors are further configured by machine-readable instructions to:
effectuate a presentation of the generated sales listing to the first player through a client computing platform that is associated with the first player; and
receive user input from the first player through the client computing platform, wherein the user input confirms the first player consent to the publication of the sales listing;
wherein the publication of the sales listing is effectuated subsequent to receipt of the user input from the first player.

3. The system of claim 1, wherein the sales information from the external online sales platform that indicates whether the particular virtual item has been purchased is received upon expiration of the limited duration.

4. The system of claim 1, wherein notifying the first player includes requesting the first player to return at least the second portion of the sales amount.

5. The system of claim 1, wherein the one or more hardware processors are further configured by machine-readable instructions to:
perform a verification whether the refund request is legitimate such that the purchase of the particular virtual item should be reverted;
wherein assigning the ownership of the particular virtual item to the first player's account is performed responsive to the verification.

6. The system of claim 1, wherein assigning the ownership of the particular virtual item temporarily to the holding account is performed such that the first player is further unable to use the particular virtual item within the online game.

7. The system of claim 1, wherein publication of the sales listing on the external online sales platform effectuates an auction for the particular virtual item.

8. The system of claim 1, wherein identifying the second player's account of the second player includes generating a redemption code for the particular virtual item, and wherein assigning the ownership of the particular virtual item to the second player's account is performed responsive to redemption of the redemption code.

9. A method for facilitating refunds from an external online sales platform for refundable transactions of virtual items between users of an online game, wherein the users include a first player of the online game and a second player of the online game, the method comprising:
storing, by a decentralized database, a registry of assets and transactions, wherein the assets include a particular virtual item, wherein ownership of the particular virtual item is assigned to an account of the first player, wherein the decentralized database represents a blockchain, and wherein assignments of the ownership of the particular virtual item are recorded on the blockchain;
managing, by a gaming platform including one or more hardware processors configured by machine-readable instructions, user accounts for the users in the online game, wherein individual ones of the user accounts are associated with individual ones of the users, wherein the individual ones of the user accounts include individual user inventories of virtual items that are usable within the online game by the individual ones of the users, wherein the first player is associated with a first player's account, and wherein the first player's account includes a first player's inventory of one or more virtual items that are usable by the first player within the online game;

receiving, by the gaming platform, a sales request that indicates the first player will be offering for sale a particular virtual item from the first player's inventory through an external online sales platform, wherein ownership of the particular virtual item is assigned to the first player's account, and wherein the external online sales platform is external to the decentralized database and the gaming platform;

transmitting a command to the decentralized database to assign the ownership of the particular virtual item temporarily to a holding account such that the first player is unable to transfer or modify the ownership of the particular virtual item while the ownership of the particular virtual item is assigned to the holding account, wherein the holding account is not under control of the first player;

receiving, by the decentralized database, the command from the gaming platform and executing the command such that the ownership of the particular virtual item is temporarily assigned to the holding account such that the first player is unable to transfer or modify the ownership of the particular virtual item while the ownership of the particular virtual item is assigned to the holding account, wherein the holding account is not under control of the first player;

generating a sales listing of the particular virtual item for publication on the external online sales platform, wherein the sales listing includes pricing information for prospective buying users and descriptive information that describes the particular virtual item;

effectuating, through a first function call of an Application Programming Interface (API) supported by the external online sales platform, the publication of the sales listing of the particular virtual item on the external online sales platform for a limited duration, wherein the publication of the sales listing is effectuated subsequent to a verification whether the first player has ownership of the particular virtual item according to an assignment recorded on the blockchain, and wherein the verification is based on information in the registry that is stored in the decentralized database;

receiving sales information from the external online sales platform indicating whether the particular virtual item has been purchased;

responsive to receipt of the sales information indicating the particular virtual item has been purchased, identifying a second player's account of a second player that has effectuated a purchase of the particular virtual item through the external online sales platform, wherein the second player's account includes a second player's inventory of virtual items that are usable by the second player within the online game;

subsequent to receipt of the sales information indicating the particular virtual item has been purchased, receiving a second command to assign the ownership of the particular virtual item to the second player's account;

transmitting a third command to the decentralized database to assign the ownership of the particular virtual item to the second player's account;

receiving, by the decentralized database, the third command from the gaming platform and executing the third command such that the ownership of the particular virtual item is assigned from the holding account to the second player's account and recorded on the blockchain, such that the particular virtual item is included in the second player's inventory and accessible to be used by the second player within the online game;

responsive to receipt of the sales information indicating the particular virtual item has been purchased, transferring at least a portion of a sales amount received from the second player to the first player's account; and responsive to receipt of the sales information indicating the particular virtual item has not been purchased, transmitting a fourth command to the decentralized database to assign the ownership of the particular virtual item to the first player's account;

receiving, by the decentralized database, the fourth command from the gaming platform and executing the fourth command such that the ownership of the particular virtual item is assigned from the holding account to the first player's account and recorded on the blockchain;

subsequent to receipt of the sales information indicating the particular virtual item has been purchased, receiving a first refund command based on a refund request from the second player that indicates the second player is attempting to revert the purchase of the particular virtual item, wherein the first refund command is received through the Application Programming Interface (API) supported by the external online sales platform, wherein the refund request is received through the external online sales platform on behalf of the second player, wherein the first refund command aims to cause the decentralized database to assign and record the ownership of the particular virtual item temporarily to the holding account, responsive to receipt of the first refund command, such that the second player is unable to transfer or modify the ownership of the particular virtual item while the ownership of the particular virtual item is assigned to the holding account, wherein the holding account is not under control of the second player;

identifying the first player's account of the first player from whom the second player purchased the particular virtual item;

notifying the first player that the second player is attempting to revert the purchase of the particular virtual item;

requesting at least a second portion of the sales amount from the first player's account;

receiving the second portion of the sales amount from the first player's account;

transferring a second refund command to the decentralized database to assign and record the ownership of the particular virtual item from the holding account to the first player's account, such that the particular virtual item is included in the first player's inventory and accessible to the used by the first player within the online game; and effectuate, through the Application Programming Interface (API) supported by the external online sales platform, a transfer of at least a third portion of the sales amount to the second player's account to complete reverting the purchase of the particular virtual item as requested by the second player through the refund request.

10. The method of claim 9, further comprising: effectuating a presentation of the generated sales listing to the first player through a client computing platform that is associated with the first player; and receiving user input from the first player through the client computing platform, wherein the user input confirms the first player consent to the publication of the sales listing;

wherein the publication of the sales listing is effectuated subsequent to receipt of the user input from the first player.

11. The method of claim 9, wherein the sales information from the external online sales platform that indicates whether the particular virtual item has been purchased is received upon expiration of the limited duration.

12. The method of claim 9, wherein notifying the first player includes requesting the first player to return at least the second portion of the sales amount.

13. The method of claim 9, further comprising:

performing a verification whether the refund request is legitimate such that the purchase of the particular virtual item should be reverted;

wherein assigning the ownership of the particular virtual item to the first player's account is performed responsive to the verification.

14. The method of claim 9, wherein assigning the ownership of the particular virtual item temporarily to the holding account is performed such that the first player is further unable to use the particular virtual item within the online game.

15. The method of claim 9, wherein publication of the sales listing on the external online sales platform effectuates an auction for the particular virtual item.

16. The method of claim 9, wherein identifying the second player's account of the second player includes generating a redemption code for the particular virtual item, and wherein assigning the ownership of the particular virtual item to the second player's account is performed responsive to redemption of the redemption code.

* * * * *